(12) United States Patent
Suzuki

(10) Patent No.: US 10,920,666 B2
(45) Date of Patent: Feb. 16, 2021

(54) AIR-COOLED ENGINE GENERATOR

(71) Applicant: YAMAHA MOTOR POWER PRODUCTS KABUSHIKI KAISHA, Kakegawa (JP)

(72) Inventor: Atsushi Suzuki, Shizuoka (JP)

(73) Assignee: YAMAHA MOTOR POWER PRODUCTS KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/682,002

(22) Filed: Nov. 13, 2019

(65) Prior Publication Data

US 2020/0158012 A1    May 21, 2020

(30) Foreign Application Priority Data

Nov. 21, 2018    (JP) .............................. JP2018-218645

(51) Int. Cl.
*F02B 63/04* (2006.01)
*F01P 5/04* (2006.01)
(Continued)

(52) U.S. Cl.
CPC .......... *F02B 63/048* (2013.01); *B63H 20/245* (2013.01); *F01P 1/02* (2013.01); *F01P 5/04* (2013.01); *F01P 5/06* (2013.01); *H02K 7/1815* (2013.01); *H02K 9/06* (2013.01); *F01P 2001/026* (2013.01)

(58) Field of Classification Search
CPC .... F02B 63/048; F01P 1/02; F01P 5/04; F01P 5/06; F01P 2001/026; H02K 7/1815; H02K 9/06; B63H 20/245; B63H 20/24; B63H 20/26; B63H 21/32

See application file for complete search history.

(56) References Cited

U.S. PATENT DOCUMENTS

2004/0063364 A1* 4/2004 Matsuda ................ B63H 21/32
440/89 R
2007/0199313 A1 8/2007 Kumasaka et al.
(Continued)

FOREIGN PATENT DOCUMENTS

JP    11-59564 A    3/1999
JP    11-200861 A   7/1999
(Continued)

*Primary Examiner* — Jacob M Amick
(74) *Attorney, Agent, or Firm* — Keating and Bennett, LLP

(57) ABSTRACT

An air-cooled engine generator usable in an enclosed and relatively small indoor space includes an engine including a crank shaft on which a generator and a fan are provided. An outside cover includes a discharge aperture which discharges cooling air generated by the fan, and covers the engine, the generator, the fan, and a cooling section. The cooling section includes a mixing chamber where a coolant introduced from the outside and exhaust gas discharged from an exhaust pipe of the engine mix with each other, and an outer circumferential surface which is cooled by the coolant that is introduced into the mixing chamber. The exhaust gas is mixed with and cooled by the coolant in the mixing chamber while the cooling air which is supposed to be discharged out of the air-cooled engine generator is cooled by the outer circumferential surface of the cooling section.

9 Claims, 5 Drawing Sheets

(51) Int. Cl.
    *H02K 7/18*      (2006.01)
    *H02K 9/06*      (2006.01)
    *B63H 20/24*     (2006.01)
    *F01P 5/06*      (2006.01)
    *F01P 1/02*      (2006.01)

(56) References Cited

U.S. PATENT DOCUMENTS

2009/0121492 A1\* 5/2009 Ito .......................... F02B 63/04
                                                         290/1 B
2011/0275258 A1   11/2011 Hamlin
2014/0378014 A1   12/2014 Minoura

FOREIGN PATENT DOCUMENTS

| JP | 2001-152847 A | 6/2001 |
| JP | 2007-224861 A | 9/2007 |
| JP | 2015-003656 A | 1/2015 |
| JP | 2016-061268 A | 4/2016 |

\* cited by examiner

FIG. 1

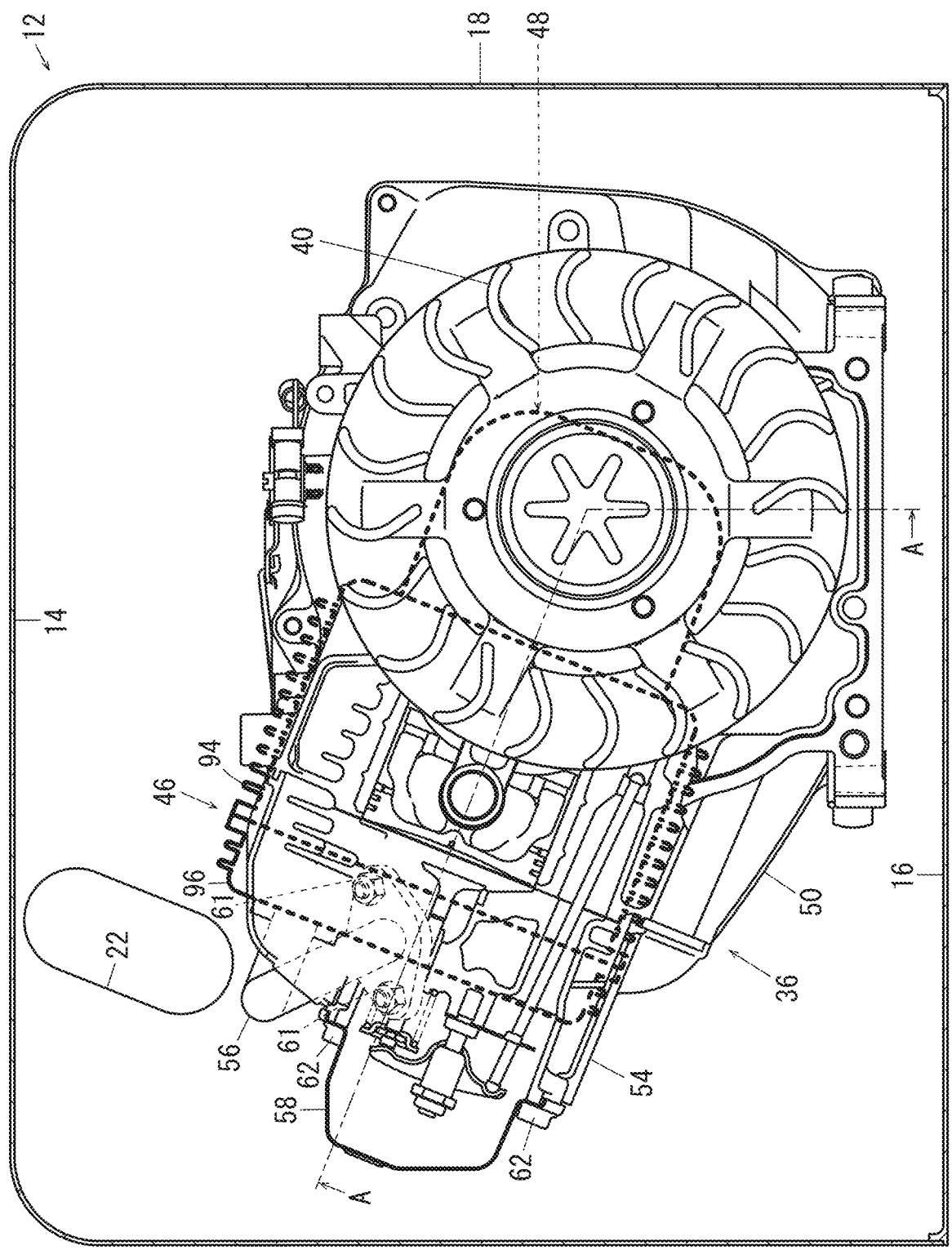

ated by the fan and to be discharged through the discharge aperture out of the air-cooled engine generator is cooled by the outer circumferential surface of the cooling section. The coolant inside the cooling section cools the exhaust gas while the outer circumferential surface of the cooling section cools the cooling air. In other words, it is possible to cool two different fluids, i.e., the exhaust gas and the cooling air, with the cooling section. Therefore, it is possible to reduce a temperature increase outside of the air-cooled engine generator even if the cooling air and the mixture of the coolant and the exhaust gas are discharged from the air-cooled engine generator. As a result, it is possible to use the air-cooled engine generator even in an enclosed and relatively small indoor space.

AIR-COOLED ENGINE GENERATOR

CROSS REFERENCE TO RELATED APPLICATIONS

This application claims the benefit of priority to Japanese Patent Application No. 2018-218645 filed on Nov. 21, 2018. The entire contents of this application are hereby incorporated herein by reference.

BACKGROUND OF THE INVENTION

1. Field of the Invention

The present invention relates to air-cooled engine generators, and more specifically to air-cooled engine generators for indoor use.

2. Description of the Related Art

Large marine vessels have a water cooled engine generator inside the vessel to power air conditioning equipment and other electric appliances. In recent years, there is an increasing request in relatively small marine vessels for the ability to use air conditioning equipment and other electric appliances inside the vessel, but for these small marine vessels in which mounting space is limited it is difficult to install a water cooled engine generator which has a large volume.

On the other hand, air-cooled engine generators for outdoor use as disclosed in JP-A H11-200861 can have a smaller volume than water cooled engine generators and therefore can be installed in small marine vessels.

However, if such an air-cooled engine generator is utilized within an enclosed environment inside the marine vessel, temperatures inside the vessel increase due to heat from the engine.

SUMMARY OF THE INVENTION

Preferred embodiments of the present invention provide air-cooled engine generators that are usable even in an enclosed and relatively small indoor space.

According to a preferred embodiment of the present invention, an air-cooled engine generator includes an engine including a cylinder block, a cylinder head attached to the cylinder block and including an exhaust port, an exhaust pipe connected to the exhaust port, and a crank shaft located in the cylinder block; a generator and a fan each provided on the crank shaft; a cover including a discharge aperture which discharges cooling air generated by the fan and that covers the engine, the generator, and the fan; and a cooling section including a mixing chamber that mixes a coolant introduced from outside of the air-cooled engine generator and exhaust gas discharged from the exhaust pipe, and an outer circumferential surface cooled by the coolant introduced into the mixing chamber.

According to preferred embodiments of the present invention, installation becomes possible even in an enclosed and relatively small indoor space due to using an air-cooled engine generator that has a small volume. Also, by introducing the coolant into the mixing chamber of the cooling section, exhaust gas is mixed with and cooled by the coolant inside the mixing chamber. Further, since the coolant introduced into the mixing chamber cools the outer circumferential surface of the cooling section, the cooling air generated by the fan and to be discharged through the discharge Preferably, the cooling section is covered by the cover. In this case, it is possible to discharge the cooling air out of the cover after cooling the air with the cooling section. Therefore, it is possible to efficiently reduce a temperature increase outside of the air-cooled engine generator.

Preferably, the cooling section is preferably located between the cylinder block and the discharge aperture, or between the cylinder head and the discharge aperture. In this case, the cooling air which has cooled the cylinder block or the cylinder head is efficiently cooled by the cooling section on its way to the discharge aperture, and is then discharged from the discharge aperture to the outside of the air-cooled engine generator. This makes it possible to reduce a temperature increase outside of the air-cooled engine generator more efficiently.

Preferably, at least a portion of the cooling section is located outside of the cover so that the cooling air discharged from the discharge aperture makes contact with the cooling section. In this case, it is possible to cool the cooling air discharged from the discharge aperture with the cooling section even if the cooling section is not covered by the cover, and therefore it is possible to make the cover smaller.

Preferably, the fan, the engine, and the cooling section are disposed in this order in an axial direction of the crank shaft from an upstream side to a downstream side of a flow of the cooling air. Preferably, at least a portion of the cylinder block or the cylinder head overlaps the cooling section in the axial direction of the crank shaft. In this case, the cooling air generated by the fan cools the cylinder block and the cylinder head, and thereafter makes contact efficiently with the outer circumferential surface of the cooling section to enhance the cooling by the outer circumferential surface.

Preferably, the fan, the engine, the cooling section, and the discharge aperture are disposed in this order in the axial direction of the crank shaft from the upstream side to the downstream side of the flow of the cooling air. In this case, the cooling air generated by the fan cools the cylinder block and the cylinder head, then is cooled by the outer circumferential surface of the cooling section, and then is discharged smoothly from the discharge aperture of the cover.

Preferably, the air-cooled engine generator further includes a pump driven by the crank shaft to introduce the coolant, and the pump is located on an opposite side of the engine from the fan in the axial direction of the crank shaft. In this case, the pump is able to be easily disassembled for maintenance.

Preferably, the engine and the pump are attached to each other. In this case, the pump is cooled by the coolant which is introduced from the outside. Therefore, the engine is cooled through contact with the pump. Therefore, it is possible to reduce a temperature increase of the cooling air by cooling the engine, and it is possible to efficiently reduce a temperature increase outside of the air-cooled engine generator even if the cooling air is discharged to the outside of the air-cooled engine generator.

Preferably, the outer circumferential surface of the cooling section is provided with a plurality of cooling fins. In this case, it is possible to further cool the cooling air.

Further, preferably, the air-cooled engine generator further includes a discharge pipe which discharges the coolant and the exhaust gas mixed in the mixing chamber to the outside, and the discharge pipe is attachable to and detachable from the cooling section. In this case, by using the discharge pipe which is attachable to and detachable from the cooling section, the air-cooled engine generator is able to be installed only when needed.

It should be noted that in a preferred embodiment of the present invention, the cover may be an outside cover or a shroud such that a discharge aperture of the cover is a discharge aperture of either one of the outside cover and the shroud.

According to preferred embodiments of the present invention, the air-cooled engine generator is usable even in an enclosed and relatively small indoor space.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is an illustrative sectional view taken along line A-A in FIG. 2 of an air-cooled engine generator according to a preferred embodiment of the present invention.

FIG. 2 is an illustrative partial sectional view which shows a primary portion of the air-cooled engine generator according to a preferred embodiment of the present invention.

DETAILED DESCRIPTION OF THE PREFERRED EMBODIMENTS

Figure 3A:
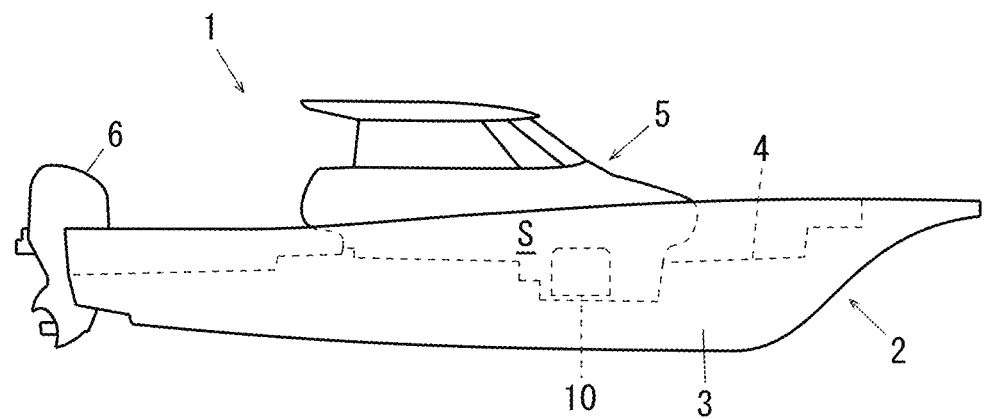
FIG. 3A is an illustrative side view which shows a small marine vessel equipped with the air-cooled engine generator in FIG. 1.

Hereinafter, preferred embodiments of the present invention will be described with reference to the drawings.

Figure 1:
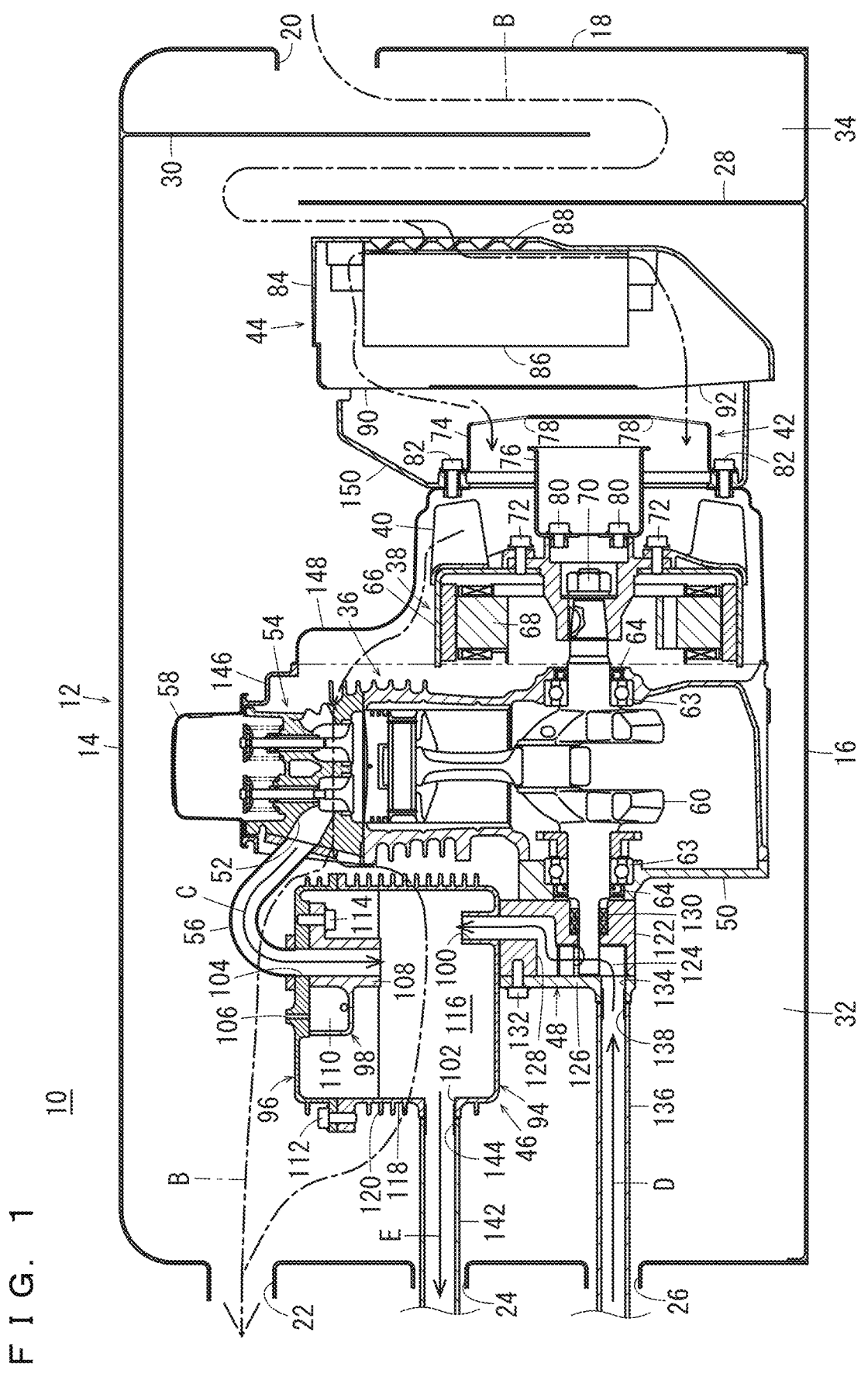

Referring to FIG. 1 and FIG. 2, an air-cooled engine generator 10 includes an outside cover 12. The outside cover 12 defines an enclosure for the air-cooled engine generator 10, and includes a ceiling portion 14, a bottom portion 16, and a side portion 18 which joins the ceiling portion 14 and the bottom portion 16. On one side of the side portion 18, an intake aperture 20 is provided. On another side of the side portion 18, a discharge aperture 22 and insertion holes 24, 26 are located at positions generally opposite to the intake aperture 20. A fan (which will be described below) rotates to introduce cooling air from the intake aperture 20 into the outside cover 12. The cooling air generated by the fan 40 is discharged from the discharge aperture 22. A discharge pipe 142 (which will be described below) is inserted into the insertion hole 24. A liquid suction pipe 136 (which will be described below) is inserted into the insertion hole 26. Inside the outside cover 12, a partition plate 28 extends upward from the bottom portion 16 near the intake aperture 20. Between the intake aperture 20 and the partition plate 28, a partition plate 30 extends downward from the ceiling portion 14. The partition plate 28 divides an inside of the outside cover 12 into a main chamber 32 and a sub-chamber 34. With the partition plates 28, 30 it is possible to make the cooling air meander from the intake aperture 20 through the sub-chamber 34 and into the main chamber 32, thus making the cooling air hit the partition plates 28, 30. Due to this, if the cooling air from the intake aperture 20 is accompanied by water droplets for example, the water droplets will drop and stay within the sub-chamber 34, and it is possible to introduce only the cooling air into the main chamber 32 as much as possible. This is especially effective if the cooling air includes sea water since the sea water stays in the sub-chamber 34 and it is possible to remove it.

The main chamber 32 of the outside cover 12 houses therein an engine 36, a generator 38, a fan 40, a recoil starter 42, an inverter device 44, a cooling section 46, a pump 48, and an unillustrated fuel tank. In other words, these components are covered by the outside cover 12. In the present preferred embodiment, the outside cover 12 covers the engine 36, the generator 38, the fan 40 and the cooling section 46, whereas the discharge aperture 22 defines a discharge aperture of the cover.

The engine 36 is an air-cooled engine, and is installed substantially at a center of and inside the main chamber 32 of the outside cover 12. The engine 36 includes a cylinder block 50, a cylinder head 54 attached to the cylinder block 50 and including an exhaust port 52, an exhaust pipe 56 connected to the exhaust port 52, a cylinder head cover 58 that covers the cylinder head 54, and a crank shaft 60 located in the cylinder block 50. The exhaust pipe 56 is connected to the exhaust port 52 with fasteners 61. The cylinder head cover 58 is connected to the cylinder head 54 with fasteners 62 (see FIG. 2). The crank shaft 60 is rotatably supported by the cylinder block 50 via two bearings 63. Two end portions of the crank shaft 60 extend out of the cylinder block 50. On an outer side of each bearing 63, a seal member 64 is provided between the cylinder block 50 and the crank shaft 60. The crank shaft 60 is located so that its axial direction extends laterally, i.e., extends from a side close to the intake aperture 20 toward a side close to the discharge aperture 22. In the present preferred embodiment, when viewed from an upstream side to a downstream side of the flow of cooling air in an axial direction of the crank shaft 60, the fan 40, the generator 38, the engine 36, the cooling section 46, and the discharge aperture 22 are disposed in this order, and further one or both of the cylinder block 50 and the cylinder head 54 overlaps with the cooling section 46.

The generator 38 in the present preferred embodiment is preferably an outer rotor type multi-polar generator, for example, and includes an outer rotor 66 and a stator 68. The outer rotor 66 is taper-fitted to an end portion of the crank shaft 60 which is the end portion on the side of the intake aperture 20, and fixed with a nut 70. The stator 68 is on an inner side of the outer rotor 66, and is fixed to the cylinder block 50 with unillustrated fasteners such as bolts.

The fan 40 is provided on a main surface of the outer rotor 66 which is on a side closer to the intake aperture 20 and annularly surrounds a center portion of the outer rotor 66 which is a region closer to the intake aperture 20, and is attached to the outer rotor 66 with fasteners 72. In this way, the generator 38 and the fan 40 are provided on the crank shaft 60. Therefore, the fan 40 and the outer rotor 66 of the generator 38 rotate with the crank shaft 60.

The recoil starter 42 includes a case 74 which houses an unillustrated spring, and a rotation member 76 which is rotated by the spring. The case 74 includes a venting hole 78. The rotation member 76 is attached to the center portion of the outer rotor 66 which is the region on the side closer to the intake aperture 20, with fasteners 80. The case 74 is attached, together with a shroud 148 (which will be described below), to a shroud 150 (which will be described below) with fasteners 82. The recoil starter 42 rotates the crank shaft 60 in order to start the engine 36.

The inverter device 44 is located between the recoil starter 42 and the partition plate 28. The inverter device 44 includes an inverter case 84, and an inverter 86 which is housed in the inverter case 84. The inverter case 84 includes an air-in aperture 88 that introduces the cooling air therein, and air-out apertures 90, 92 that discharge the cooling air. The inverter 86 changes frequencies of the electric power generated by the generator 38.

The cooling section 46 is preferably box-shaped or substantially box-shaped, and is on a side closer to the discharge aperture 22 than the engine 36 is, i.e., between the cylinder block 50 and cylinder head 54 assembly and the discharge aperture 22. The cooling section 46 includes a container 94 having an open top, a lid portion 96 which closes the top of the container 94, and an auxiliary section 98 which is attached to a lower surface of the lid portion 96.

The container 94 includes an inlet 100 that introduces a coolant therein, and a gas-liquid outlet 102 that discharges the coolant and exhaust gas. In the present preferred embodiment, the coolant is water, for example. The inlet 100 is provided in a bottom portion of the container 94. The gas-liquid outlet 102 is provided in a side portion of the container 94. The lid portion 96 includes a mounting hole 104 that attaches an exhaust pipe 56 which introduces the exhaust gas from the engine 36, and a venting hole 106 that discharges the exhaust gas. The auxiliary section 98 includes a guide portion 108 which is positioned adjacent to the mounting hole 104 in order to introduce the exhaust gas into the cooling section 46, and a storage portion 110 that temporarily stores the exhaust gas which must be discharged from the venting hole 106 to remove the exhaust gas. The lid portion 96 is attached to an upper surface of the container 94 with fasteners 112. The auxiliary section 98 is attached to a lower surface of the lid portion 96 with fasteners 114. The exhaust pipe 56 is attached to the upper surface of the lid portion 96 at the mounting hole 104.

The cooling section 46 includes a mixing chamber 116 where the coolant introduced from the outside of the air-cooled engine generator 10 and the exhaust gas discharged from the exhaust pipe 56 of the engine 36 mix with each other, and an outer circumferential surface 118 which defines an outer circumference of the cooling section 46 and is cooled by the coolant which is introduced into the mixing chamber 116. The outer circumferential surface 118 is provided with a plurality of cooling fins 120. The container 94, the lid portion 96, and the auxiliary section 98 that define the cooling section 46 are made of a material which is capable of cooling the outer circumferential surface 118 with the coolant inside the mixing chamber 116, for example, an aluminum alloy or a magnesium alloy.

Also, in the cooling section 46, a pump 48 is attached to the inlet 100 of the container 94. The pump 48 is located on an opposite side of the engine 36 from the fan 40 in the axial direction of the crank shaft 60, and is driven by the crank shaft 60 in order to introduce the coolant. The pump 48 includes a pump case 122, a pump main body 124, and a pump cover 126. The pump case 122 includes a flow path 128 for the coolant to flow. The pump main body 124 is housed on an upstream side of the flow path 128. The pump case 122 and the pump main body 124 are attached to an end portion of the crank shaft 60 which is the end portion of the crank shaft 60 on the side of the discharge aperture 22. The pump case 122 is positioned on a lower surface of the container 94 so that the flow path 128 has its exit corresponding to the inlet 100. In this state, a side surface of the pump case 122 and a side surface of the cylinder block 50 are attached to each other, such that the engine 36 and the pump 48 are attached to each other. Additionally, a seal 130 is located between the pump case 122 and the crank shaft 60. Further, the pump cover 126 is attached to the pump case 122 with fasteners 132, from the side of the discharge aperture 22, so as to sandwich the pump main body 124. The pump cover 126 includes a through-hole 134 at a location corresponding to an entrance to the flow path 128.

The pump 48 includes a liquid suction pipe 136 that is detachable from and attachable to the pump 48 to introduce the coolant. The liquid suction pipe 136, which is positioned on the pump cover 126 so that its tip portion is at a location corresponding to the through-hole 134, is attached to the pump cover 126 in a detachable/attachable manner via a cylindrical adapter 138. The liquid suction pipe 136 extends through the insertion hole 26, extends out of the outside cover 12, and is connected to the water stop valve 140 (see FIGS. 3A and 3B). Also, in the cooling section 46, a discharge pipe 142 is attached to the container 94 in a detachable/attachable manner. The discharge pipe 142, which is positioned on the container 94 so that its tip portion is at a location corresponding to the discharge aperture 102, is attached to the container 94 in a detachable/attachable manner via a cylindrical adapter 144. The discharge pipe 142 extends through the insertion hole 24 and then out of the outside cover 12.

Also, the engine 36 is covered with a shroud 146 which is connected to the head cover 58. The generator 38 is covered with the shroud 148 which is connected to the shroud 146. The cover 74 of the recoil starter 42 and other elements are covered by the shroud 150 which is provided between the shroud 148 and the inverter cover 84.

Figure 3B:
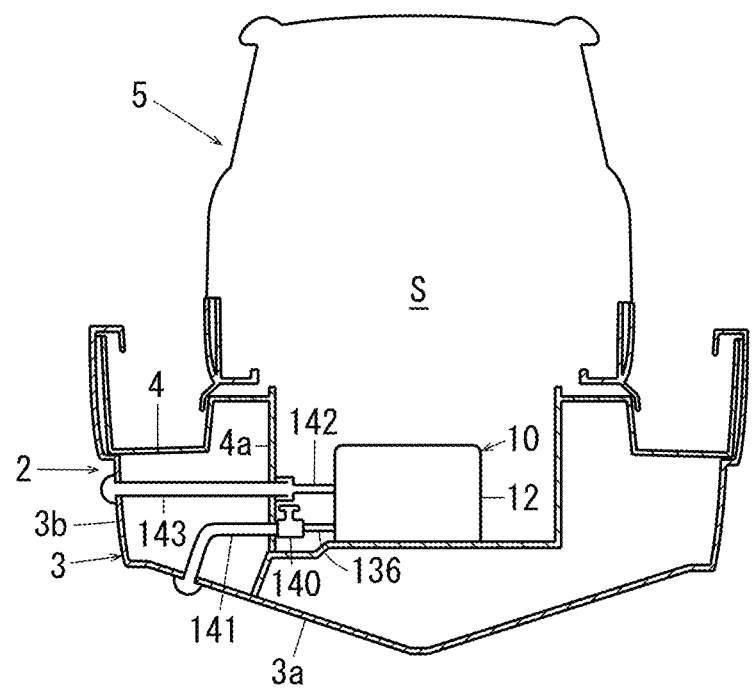
FIG. 3B is an illustrative sectional view thereof.

The air-cooled engine generator 10 is able to be installed, for example, in a small marine vessel 1 as shown in FIGS. 3A and 3B.

Referring to FIGS. 3A and 3B, the small marine vessel 1 includes a vessel body 2. The vessel body 2 includes a hull 3 and a deck 4. The hull 3 has an upward opening boat shape. The deck 4 is attached to the hull 3 such that the deck 4 fits into the opening of the hull 3. Above the deck 4, a bridge 5 is provided. The deck 4 and the bridge 5 provide a space S which has its front, upper, lower and lateral sides surrounded thereby, and an operator seat (not illustrated) is provided therein. The air-cooled engine generator 10 may be disposed in the space S, for example. At a rear of the hull 3, an outboard engine 6 is attached. The liquid suction pipe 136, which extends out of the outside cover 12 of the air-cooled engine generator 10, is connected to a hose 141 via the water stop valve 140. The hose 141 extends through a side portion 4a of the deck 4 and a bottom portion 3a of the hull 3, and is exposed to the outside of the hull 3. The discharge pipe 142, which extends out of the outside cover 12 of the air-cooled engine generator 10, is connected to a hose 143. The hose 143 extends through the side portion 4a of the deck 4 and a side portion 3b of the hull 3, and is exposed to the outside of the hull 3.

Description will now cover how the cooling air, the exhaust gas, and the coolant will flow in the air-cooled engine generator 10 described above, with reference to FIG. 1. In FIG. 1, Arrow B which is drawn in alternate long and short dash lines shows the flow of the cooling air; Arrow C drawn in a solid line shows the flow of the exhaust gas; Arrow D in a solid line shows the flow of the coolant; and Arrow E in a solid line shows the flow of the mixture of the exhaust gas and the coolant. The same applies to FIG. 4 and FIG. 5.

First, as the engine 36 is driven to rotate the crank shaft 60, the outer rotor 66 of the generator 38 rotates and the fan 40 rotates together therewith. This introduces cooling air from the intake aperture 20 which is provided in the side portion 18 of the outside cover 12, into the outside cover 12. The cooling air meanders through the sub-chamber 34 and moves into the main chamber 32. In this process, moisture, such as sea water accompanying the cooling air, drops into the sub-chamber 34 so substantially only the cooling air is introduced into the main chamber 32. In the main chamber 32, the cooling air goes through the air-in aperture 88 into the inverter case 84, cools the inverter 86 and then comes out of the air-out apertures 90, 92. Thereafter, the cooling air goes through the venting hole 78 in the case 74 of the recoil starter 42, and cools the generator 38. Thereafter, the cooling air makes contact with outer surfaces of the cylinder block 50 and the cylinder head 54 of the engine 36, and cools the cylinder block 50 and the cylinder head 54. In particular, it is possible to cool an area near the exhaust port 52 of the cylinder head 54. The cooling air further makes contact with the outer circumferential surface 118 of the cooling section 46.

Rotation of the crank shaft 60 also drives the pump 48. Therefore, when the water stop valve 140 is set to an open state, sea water around the small marine vessel 1 is introduced through the hose 141, the water stop valve 140, the liquid suction pipe 136 and the pump 48, into the mixing chamber 116 of the cooling section 46. In the mixing chamber 116, exhaust gas from the engine 36 introduced via the exhaust pipe 56 is mixed with the coolant and cooled by the coolant. Then, the exhaust gas and the coolant which are mixed with each other in the mixing chamber 116 pass through the discharge pipe 142 and the hose 143, out of the air-cooled engine generator 10, i.e., from the space S to the outside.

The coolant inside the mixing chamber 116 also cools the outer circumferential surface 118 of the cooling section 46. Therefore, the cooling air which has contacted the outer surfaces of the cylinder block 50 and the cylinder head 54 and cooled the engine 36 is then cooled by contacting the outer circumferential surface 118 of the cooling section 46, and thereafter discharged from the discharge aperture 22.

The air-cooled engine generator 10 is able to be installed even in an enclosed and relatively small indoor space (space S) since it utilizes an air-cooled engine generator which has a small volume. Also, by introducing the coolant into the mixing chamber 116 of the cooling section 46, exhaust gas is mixed with and cooled by the coolant inside the mixing chamber 116. Further, since the coolant which is introduced into the mixing chamber 116 cools the outer circumferential surface 118 of the cooling section 46, the cooling air which is generated by the fan 40 and is to be discharged through the discharge aperture 22 out of the air-cooled engine generator 10, is cooled by the outer circumferential surface 118 of the cooling section 46. The coolant inside the cooling section 46 cools the exhaust gas while the outer circumferential surface 118 of the cooling section 46 cools the cooling air. In other words, it is possible to cool two different fluids, i.e., the exhaust gas and the cooling air, with the cooling section 46. Therefore, it is possible to reduce a temperature increase outside of the air-cooled engine generator 10 even if the cooling air and the mixture of the coolant and the exhaust gas are discharged from the air-cooled engine generator 10. As a result, it is possible to use the air-cooled engine generator 10 even in an enclosed and relatively small indoor space.

Since it is possible to discharge the cooling air out of the outside cover 12 after cooling the air with the cooling section 46, it is possible to efficiently reduce a temperature increase outside of the air-cooled engine generator 10.

The cooling air which has cooled the cylinder block 50 and the cylinder head 54 is efficiently cooled by the cooling section 46 on its way to the discharge aperture 22, and then discharged from the discharge aperture 22 to the outside of the air-cooled engine generator 10. This makes it possible to reduce a temperature increase outside of the air-cooled engine generator 10 more efficiently.

The cooling air generated by the fan 40 cools the cylinder block 50 and the cylinder head 54, and thereafter makes contact efficiently with the outer circumferential surface 118 of the cooling section 46 to enhance cooling by the outer circumferential surface 118.

It is possible that the cooling air generated by the fan 40 cools the cylinder block 50 and the cylinder head 54, then is cooled by the outer circumferential surface 118 of the cooling section 46, and then discharged smoothly from the discharge aperture 22 of the outside cover 12.

The pump 48 is located on an opposite side of the engine 36 from the fan 40 in the axial direction of the crank shaft 60. This makes it easy to disassemble the pump 48 for maintenance purposes.

The cooling section 46 preferably includes a plurality of cooling fins 120 on its outer circumferential surface 118. This makes it possible to further cool the cooling air.

The pump 48 is cooled by the coolant which is introduced from the outside. Therefore, the engine 36 is cooled through contact with the pump 48. Thus, it is possible to reduce a temperature increase of the cooling air when cooling the engine 36 and it is possible to efficiently reduce a temperature increase outside of the air-cooled engine generator 10 even if the cooling air is discharged to the outside of the air-cooled engine generator 10.

By using the discharge pipe 142 which is attachable to/detachable from the cooling section 46, the air-cooled engine generator 10 is able to be installed only when needed.

As shown in FIGS. 3A and 3B, it is effective to place the air-cooled engine generator 10 in the space S provided in the bridge 5 of the small marine vessel 1. In other words, since it is possible to reduce a temperature increase outside of the air-cooled engine generator 10, it is possible to reduce a temperature increase in the space S occupied by the operator. As another structural arrangement, a hose which communicates with the outside of the space S may be attachable to and detachable from the discharge aperture 22. The structural arrangement makes it possible to discharge the cooling air from inside of the outside cover 12 to the outside of the space S, and therefore to further reduce a temperature increase in the space S occupied by the operator.

Figure 4:
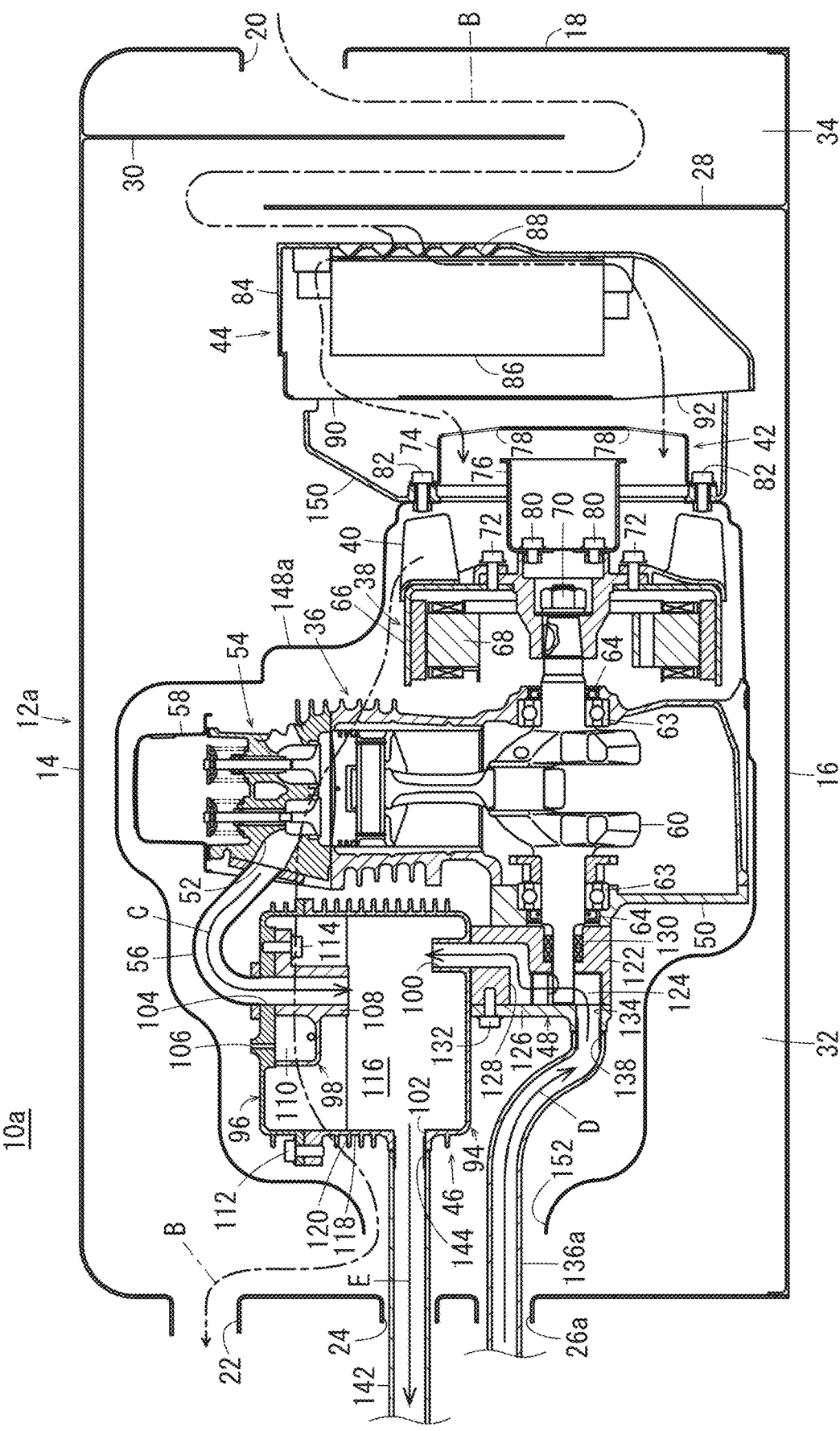
FIG. 4 is an illustrative sectional view which shows an air-cooled engine generator according to another preferred embodiment of the present invention.

Referring to FIG. 4, description will be made of an air-cooled engine generator 10a according to another preferred embodiment of the present invention.

Different from the air-cooled engine generator 10 in FIG. 1, the air-cooled engine generator 10a uses a shroud 148a instead of the shrouds 146, 148; an outside cover 12a instead of the outside cover 12; and a liquid suction pipe 136a instead of the liquid suction pipe 136. The shroud 148a covers the engine 36, the generator 38, the fan 40, the cooling section 46, and the pump 48. In the present preferred embodiment, the shroud 148a defines a cover which covers the engine 36, the generator 38, the fan 40, and the cooling section 46, and the discharge aperture 152 of the shroud 148a defines a discharge aperture of the cover. The outside cover 12a includes an insertion hole 26a located at a higher position than the insertion hole 26 of the outside cover 12. The liquid suction pipe 136a is preferably longer than the liquid suction pipe 136. The other components and configurations of the air-cooled engine generator 10a preferably are the same as the air-cooled engine generator 10. These components and elements are indicated with the same reference symbols and their detailed description will not be repeated.

According to the air-cooled engine generator 10a, the same advantages as provided by the air-cooled engine generator 10 are obtained.

Figure 5:
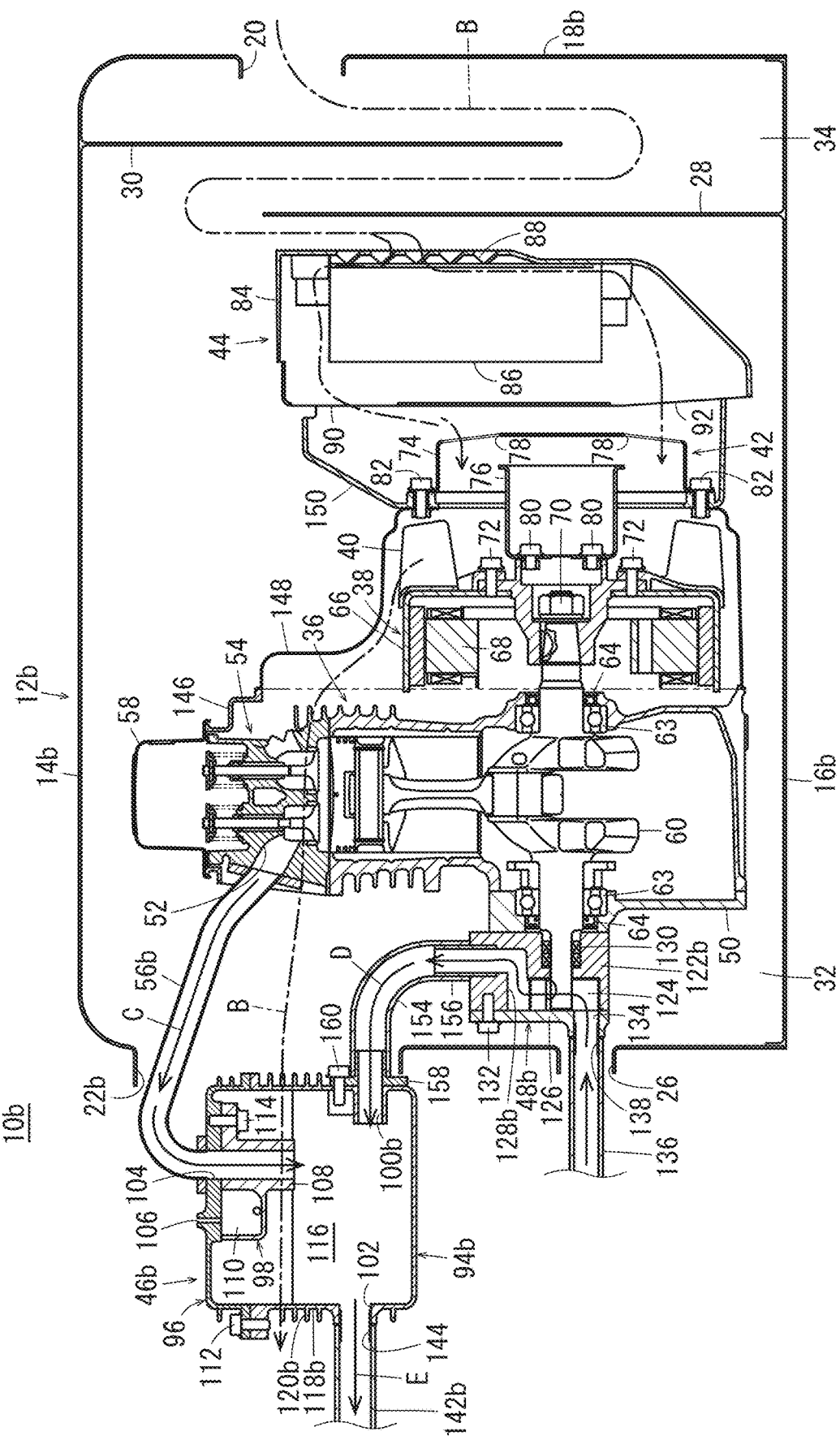
FIG. 5 is an illustrative sectional view which shows an air-cooled engine generator according to still another preferred embodiment of the present invention.

Referring to FIG. 5, description will be made of an air-cooled engine generator 10b according to still another preferred embodiment of the present invention.

Different from the air-cooled engine generator 10 in FIG. 1, the air-cooled engine generator 10b uses an outside cover 12b, a cooling section 46b, a pump 48b, an exhaust pipe 56b, and a discharge pipe 142b instead of the outside cover 12, the cooling section 46, the pump 48, the exhaust pipe 56, and the discharge pipe 142, respectively.

The outside cover 12b covers the engine 36, the generator 38, the fan 40, and the pump 48b but does not cover the cooling section 46b, and thus has a smaller lateral dimension than the outside cover 12 of the air-cooled engine generator 10. In other words, the outside cover 12b includes a ceiling portion 14b and a bottom portion 16b which have a shorter lateral dimension than the ceiling portion 14 and the bottom portion 16 of the outside cover 12. The ceiling portion 14b and the bottom portion 16b are joined to each other by a side portion 18b, where a discharge aperture 22b larger than the discharge aperture 22 is provided at a location generally opposite from the intake aperture 20, but an insertion hole 24 is not provided in the side portion 18b. In the present preferred embodiment, the outside cover 12b defines a cover that covers the engine 36, the generator 38, and the fan 40, and the discharge aperture 22b defines a discharge aperture of the cover.

The cooling section 46b is provided on an outer side of the outside cover 12b, near the discharge aperture 22b, and includes a container 94b instead of the container 94 of the cooling section 46. Instead of the inlet 100 in the container 94, the container 94b includes an inlet 100b on a side portion thereof facing toward the outside cover 12b. The cooling section 46b includes a plurality of cooling fins 120b provided on its outer circumferential surface 118b.

The pump 48b includes a pump case 122b instead of the pump case 122 of the pump 48. An L-shaped or substantially L-shaped joint pipe 154 communicates a downstream end of a flow path 128b of the pump case 122b with the inlet 100b of the container 94b. Specifically, a cylindrical adapter 156 is inserted into the downstream end of the flow path 128b of the pump case 122b, while a first end portion of the joint pipe 154 is fitted to the adapter 156. Also, the joint pipe 154 includes a second end portion into which a hollow adapter 158 is inserted. With the adapter 158 being positioned on the inlet 100b, the adapter 158 is attached to the container 94b with a fastener 160.

The exhaust pipe 56b is longer than the exhaust pipe 56, and provides communication between the exhaust port 52 of the engine 36 and the mounting hole 104 of the cooling section 46b, which is located on the outside of the outside cover 12b. The discharge pipe 142b is shorter than the discharge pipe 142.

The other components and configurations of the air-cooled engine generator 10b preferably are the same as the air-cooled engine generator 10. These components and elements are indicated with the same reference symbols and their detailed description will not be repeated.

According to the air-cooled engine generator 10b, it is possible to cool the cooling air discharged from the discharge aperture 22b with the cooling section 46b even if the cooling section 46b is not covered by the outside cover 12b, and therefore it is possible to make the outside cover 12b smaller.

In the preferred embodiment shown in FIG. 5, the cooling section 46b is located outside of the outside cover 12b. However, the present invention is not limited to this, and it is possible for at least a portion of the cooling section 46b to be located outside of the outside cover 12b so that the cooling air discharged from the discharge aperture 22b makes contact with the cooling section 46b.

In an air-cooled engine generator according to a preferred embodiment of the present invention, at least a portion of the cylinder block 50 or the cylinder head 54 overlaps the cooling section in the axial direction of the crank shaft 60 when viewed from the upstream side to the downstream side of the flow of the cooling air.

The cooling section may be located between either one of the cylinder block 50 and the cylinder head 54 and the discharge aperture of the cover.

The discharge aperture of the cover may be provided in the upper ceiling portion or in the lower bottom portion of the cover.

The coolant is not limited to water. Any liquid which is able to cool the exhaust gas or the outer circumferential surface of the cooling section may be used.

In the preferred embodiments of the present invention described above, description was made in which the air-cooled engine generator is installed inside the small marine vessel 1. However, the present invention is not limited to this. The air-cooled engine generator according may be suitably used in any enclosed and relatively small indoor space.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An air-cooled engine generator comprising:
   an engine including a cylinder block, a cylinder head attached to the cylinder block and including an exhaust port, an exhaust pipe connected to the exhaust port, and a crank shaft located in the cylinder block;
   a generator and a fan each provided on the crank shaft;
   a cover including a discharge aperture which discharges cooling air generated by the fan and that covers the engine, the generator, and the fan; and
   a cooling section including a mixing chamber that mixes a coolant introduced from outside of the air-cooled engine generator and exhaust gas discharged from the exhaust pipe, and an outer circumferential surface cooled by the coolant introduced into the mixing chamber; wherein at least a portion of the cooling section is located outside of the cover so that the cooling air discharged from the discharge aperture makes contact with the cooling section.

2. The air-cooled engine generator according to claim 1, wherein the fan, the engine, and the cooling section are disposed in this order in an axial direction of the crank shaft from an upstream side to a downstream side of a flow of the cooling air, and at least a portion of the cylinder block or the cylinder head overlaps the cooling section in the axial direction of the crank shaft.

3. The air-cooled engine generator according to claim 2, wherein the fan, the engine, the cooling section, and the discharge aperture are disposed in this order in the axial direction of the crank shaft from the upstream side to the downstream side of the flow of the cooling air.

4. An air-cooled engine generator comprising:
- an engine including a cylinder block, a cylinder head attached to the cylinder block and including an exhaust port, an exhaust pipe connected to the exhaust port, and a crank shaft located in the cylinder block;
- a generator and a fan each provided on the crank shaft;
- a cover including a discharge aperture which discharges cooling air generated by the fan and that covers the engine, the generator, and the fan;
- a cooling section including a mixing chamber that mixes a coolant introduced from outside of the air-cooled engine generator and exhaust gas discharged from the exhaust pipe, and an outer circumferential surface cooled by the coolant introduced into the mixing chamber; and
- a pump driven by the crank shaft to introduce the coolant to the air-cooled engine generator; wherein the pump is located on an opposite side of the engine from the fan in an axial direction of the crank shaft.

5. The air-cooled engine generator according to claim 4, wherein the engine and the pump are attached to each other.

6. The air-cooled engine generator according to claim 1, wherein the outer circumferential surface of the cooling section includes a plurality of cooling fins.

7. The air-cooled engine generator according to claim 1, further comprising:
- a discharge pipe that discharges the coolant and the exhaust gas mixed in the mixing chamber to the outside; wherein the discharge pipe is attachable to and detachable from the cooling section.

8. The air-cooled engine generator according to claim 4, wherein the cooling section is covered by the cover.

9. The air-cooled engine generator according to claim 8, wherein the cooling section is located between the cylinder block and the discharge aperture, or between the cylinder head and the discharge aperture.

* * * * *